May 17, 1932.  E. L. BARRETT  1,858,571

ALTERNATING CURRENT MOTOR

Filed April 11, 1929

Inventor
Edward L. Barrett

Patented May 17, 1932

1,858,571

UNITED STATES PATENT OFFICE

EDWARD L. BARRETT, OF CHICAGO, ILLINOIS, ASSIGNOR TO UTAH RADIO PRODUCTS CO., OF CHICAGO, ILLINOIS, A CORPORATION OF ILLINOIS

ALTERNATING CURRENT MOTOR

Application filed April 11, 1929. Serial No. 354,193.

The invention relates generally to alternating current motors of the type known as induction motors, and has as its primary object the production of a new and improved motor of this general type in which the direction of rotation is reversible.

An object of the invention is to provide a motor of this general type embodying a plurality of poles which are permanently shaded to induce a rotating magnetic field, certain of which differ from others by being oppositely shaded, so that upon energization of one series of like shaded poles the induced magnetic field will rotate in one direction, and energization of the other series of poles creates a magnetic field rotating in the opposite direction.

In connection with the foregoing object, the invention also contemplates the provision of means on the magnetic field structure by which indirect energization of the unenergized poles by the energized poles is prevented.

Other objects and advantages will become apparent in the following description and from the accompanying drawings, in which.

Figure 1:
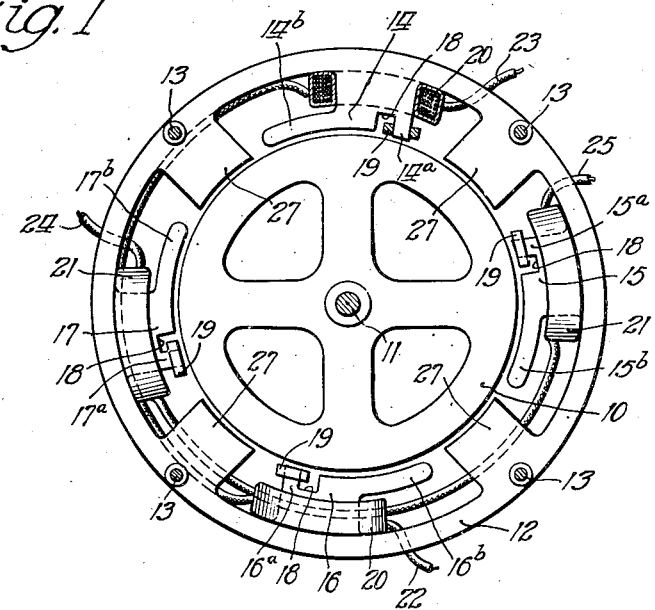
Figure 1 is a transverse elevation partially in section showing an end face view of the magnetic field structure and rotor.

In accomplishing the objects of the invention, the fact that the shading of certain portions of the poles of the magnetic field structure causes a progressive rotating shift in the magnetic field from the unshaded to the shaded portion of the poles is utilized to effect rotation of the armature or rotor in the same direction as the shift in the field. Therefore, by providing a plurality of pairs of oppositely disposed poles surrounding the rotor, certain of which pairs are shaded on one side for inducing a rotation of the rotor in one direction while the remaining sets of pole pieces are oppositely shaded to induce a rotation of the rotor in an opposite direction, and by further providing means for selectively energizing one or the other of said sets of poles, rotation of the rotor in one direction or the other may be produced.

In the drawings the features of the invention have been illustrated as being embodied in an induction motor of the single phase type. Thus, 10 designates generally an armature or rotor of the "squirrel cage" type mounted in any suitable manner upon an armature shaft 11 for rotational movement. Surrounding the rotor is a magnetic field structure or stator 12 built up in the usual manner in the form of a laminated structure secured together by means of bolts 13, or the like.

In the common construction of a motor of this type, two or more pole units, formed as an integral part of the magnetic field structure, are arranged to be excited by a coil or other suitable winding connected to a source of alternating current. In the present embodiment four poles 14, 15, 16 and 17, are shown spaced equidistantly about the stator and the diametrically opposed poles 14, 16 and 15, 17 comprise the sets of poles forming the pole units. In consequence, the motor illustrated is of the type known as a two pole motor, inasmuch as at any time only two of the four poles will be energized. It is contemplated, however, that additional pole units may be provided if desired.

The active face of each of the poles is divided into two sections, as by means of a transverse slot or recess 18 positioned relatively near one side of the face, thus dividing the face into sections of unequal face area. Each of the pole sections of smaller area, designated $14^a$, $15^a$, $16^a$, $17^a$, respectively, constitute the shaded section of the pole and are arranged to receive a permanently closed, short-circuiting, shading ring 19 which may be in the form of a centrally apertured disk or slug of copper, or similarly good conducting material. In order to increase the area of the active face of the unshaded pole sections, lateral extensions, or toes, $14^b$, $15^b$, $16^b$ and $17^b$, respectively, are formed on each of the poles, and extend from the side thereof opposite the shaded sections.

It will be observed that the poles of one pole unit are shaded to induce rotation of the rotor in the same direction, but that the poles of the other pole unit are oppositely shaded to induce rotation in the opposite direction.

That is to say, the poles 14 and 16 are shaded upon the right hand side (looking at the active face thereof) while the poles 15 and 17 are shaded on the left hand side. Consequently, the poles 14 and 16, when energized, will induce rotation of the rotor 10 in a clockwise direction, and the energization of the poles 15 and 17 will induce rotation of the rotor in a counter-clockwise direction.

Figure 2:
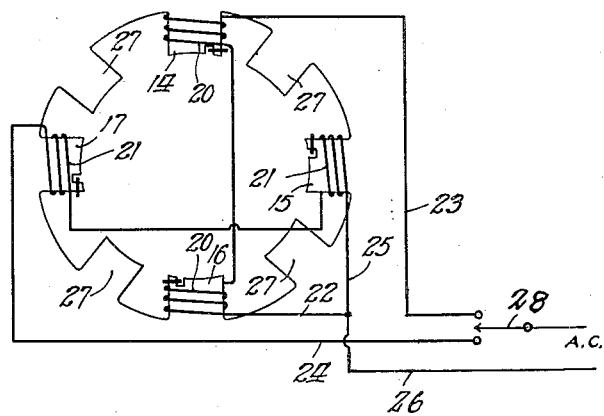
Fig. 2 is a diagrammatic illustration of the motor circuits.

Each of the poles which induce rotation in the same direction, as for example the poles 14 and 16, is adapted to be energized by means of a coil or other suitable winding 20, which coils are connected in series and are reversed with respect to each other in the customary manner. Similarly, a second pair of coils 21, connected and reversed in the same manner, surround the pole pieces 15 and 17. This arrangement of energizing coils is more clearly apparent in the diagrammatic illustration of Fig. 2.

Suitable leads 22, 23 for the coils 20, and 24, 25 for the coils 21 are provided for connecting the respective coils with a source of alternating current (not shown). If desired, one of the leads from each set of coils, as for example, the leads 22 and 25, may be connected to a common lead 26. It will be readily seen, therefore, that by establishing a circuit through the leads 23, 26 the coils 20 will be energized to induce rotation of the rotor in a clockwise direction, while, on the other hand, a circuit established through the leads 24, 26 energizes the coils 21 to induce rotation in a counterclockwise direction. For the purpose of establishing these circuits any suitable type of selector switch, as indicated at 28, may be provided.

It is contemplated that a motor embodying the structural elements heretofore described might be of relatively low efficiency due to the fact that part of the flux flowing between the energized poles across the space occupied by the rotor will probably be "shorted" through the intermediate unenergized poles. Consequently, an induced flux might be created in the unenergized poles which, since these poles induce rotation in a direction opposite from the direction of rotation induced by the energized poles, would have an opposing effect tending to decrease materially the efficiency of the motor. It has been found, however, that by providing means, intermediate and separating each pole from the next adjacent pole to intercept that part of the flux which otherwise might flow into the unenergized poles, any induced opposing flux may be substantially eliminated.

To this end the stator is provided with a plurality of integrally formed inwardly extending members 27 which are spaced from and are positioned between adjacent poles. The members 27 are substantially the full width of the stator and the face thereof is positioned adjacent the rotor as in the case of the energized poles. It may be said that the members 27 constitute dummy poles inasmuch as they are not provided with windings or other energizing means and serve merely to provide a short circuit or path which may be traversed by a part of the magnetic flux flowing out of the energized poles. Hence, any portion of the magnetic flux which does not flow directly between the energized poles will flow from the energized poles to the adjacent shorting members 27, instead of to the unenergized poles thereby preventing an induced opposing flux from being set up in the unenergized poles.

Although the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

I claim as my invention:

1. In a device of the character described, a magnetic field structure having a plurality of poles thereon, shading means on certain of said poles for inducing a magnetic field constantly rotating in one direction when said poles are energized, shading means on others of said poles for inducing a magnetic field constantly rotating in the opposite direction when said last mentioned poles are energized, means interposed between each of said poles for interrupting a flow of magnetic flux between adjacent poles, and means for selectively energizing one or the other groups of said like shaded poles.

2. An alternating current motor comprising, in combination, a rotor, and means for inducing rotation of said rotor in one direction or the other including poles permanently shaded to induce rotation of said rotor in one direction, other poles permanently and oppositely shaded to induce rotation of said rotor in the opposite direction, means for selectively energizing the similarly shaded poles, and means for preventing the flow of flux from the energized poles to the unenergized poles.

3. An alternating current motor comprising, in combination, a rotor, a magnetic field structure for inducing rotation thereof, said structure having poles permanently shaded to induce rotation of the rotor in one direction, other poles on said structure permanently shaded to induce rotation of the rotor in the opposite direction, means for separately and selectively energizing the like shaded poles, and an unenergized pole on said structure separating each shaded pole from the next adjacent shaded pole.

4. In an alternating current motor, a magnetic field structure comprising a plurality of pole units, permanently short-circuited shading means on certain of said units to induce a magnetic field rotating in one direction, permanently short-circuited shading means on other units to induce a magnetic field rotating in the opposite direction, energizing windings on said units for energizing one or the other groups of the similarly shaded units, and unenergized poles interposed between the oppositely shaded pole units.

5. In a reversible alternating current motor, a magnetic field structure having poles permanently shaded to induce a magnetic field rotating in one direction and having other poles permanently and oppositely shaded to induce a magnetic field rotating in the opposite direction, means for selectively energizing one or the other groups of like shaded poles, and means for preventing induced energization of the unenergized group of poles from any of the energized poles including means interposed between oppositely shaded poles for interrupting a flow of magnetic flux between energized and unenergized poles.

In testimony whereof, I have hereunto affixed my signature.

EDWARD L. BARRETT.